Jan. 14, 1936. E. B. FISH Re. 19,821

MULTIPLE PLY PAPER

Original Filed Nov. 1, 1921 2 Sheets-Sheet 1

INVENTOR.
EZRA B. FISH.

Allen & Allen
ATTORNEYS.

Jan. 14, 1936. E. B. FISH Re. 19,821

MULTIPLE PLY PAPER

Original Filed Nov. 1, 1921 2 Sheets-Sheet 2

INVENTOR.
EZRA B. FISH.
BY Allen & Allen
ATTORNEYS.

Reissued Jan. 14, 1936 Re. 19,821

UNITED STATES PATENT OFFICE 19,821

MULTIPLE-PLY PAPER

Ezra B. Fish, Kansas City, Mo., assignor, by mesne assignments, to The Interstate Folding Box Company, Middletown, Ohio, a corporation of Ohio Original application November 1, 1921, Serial No. 512,148. Divided and application May 2, 1923, Serial No. 636,198, Patent No. 1,552,286, dated September 1, 1925. This application for reissue September 12, 1935, Serial No. 40,349

4 Claims. (Cl. 92—40)

The present invention has for its object to provide a multiple-ply paper wherein the plies or layers are permanently and inseparably united to form a substantially homogeneous unitary structure, the paper being particularly suitable for use for photographic purposes, having outer plies or layers on its opposite sides which may be white or of other suitable color and adapted to receive the sensitized emulsions and an intermediate light intercepting ply or layer which is black or otherwise permanently opaque or non-actinic, the plies of the sheet thus formed being permanently united so that they will not separate or blister when wet or treated in photographic developing, fixing and washing baths, and the sheet will always remain opaque.

The invention will be described in connection with the accompanying drawings which disclose the structure of the paper in its preferred form and suitable for photographic purposes, and an example of an apparatus suitable for use in the manufacture of such paper.

In these drawings:—

Figure 1:
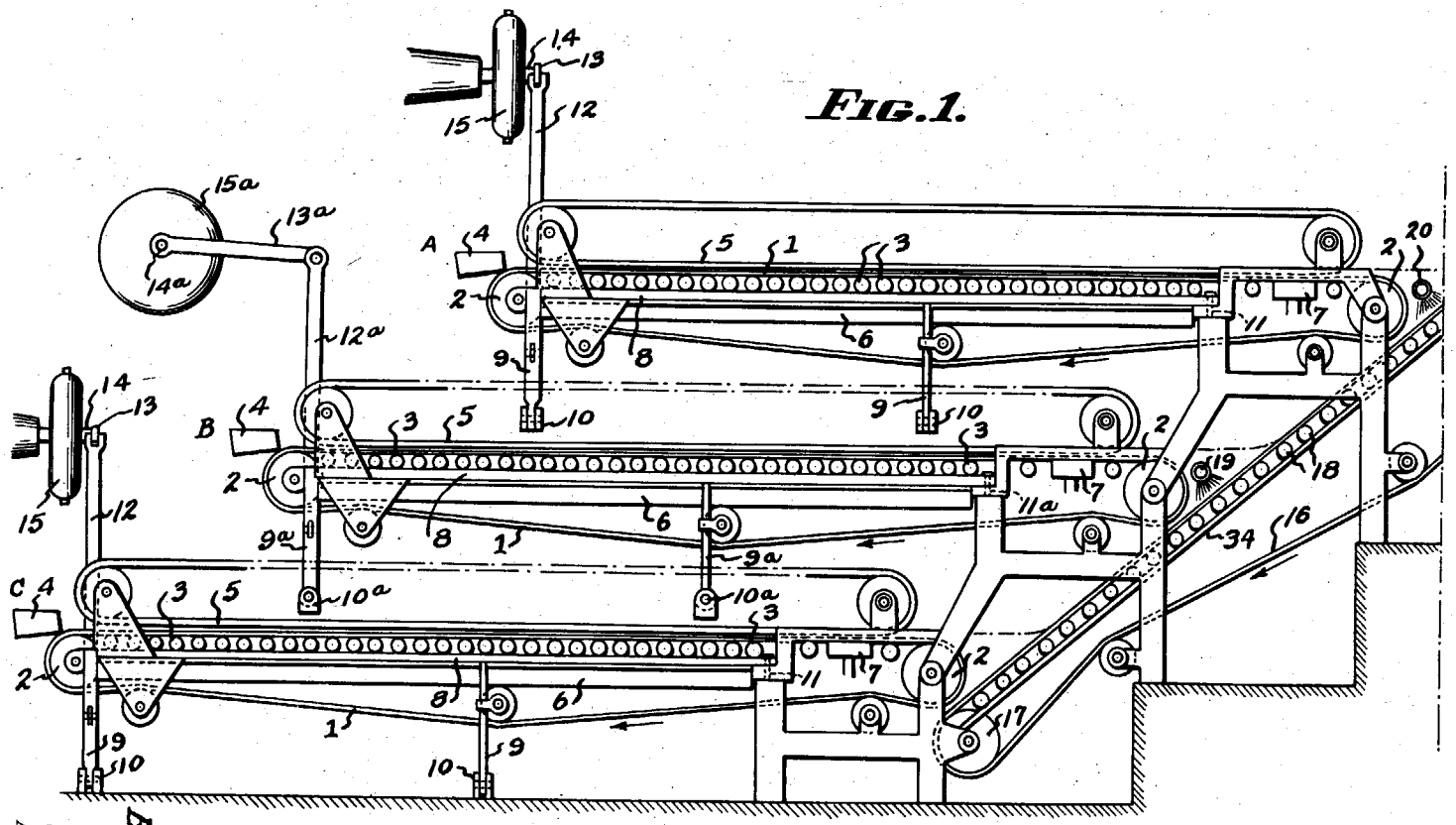
Figure 1A:
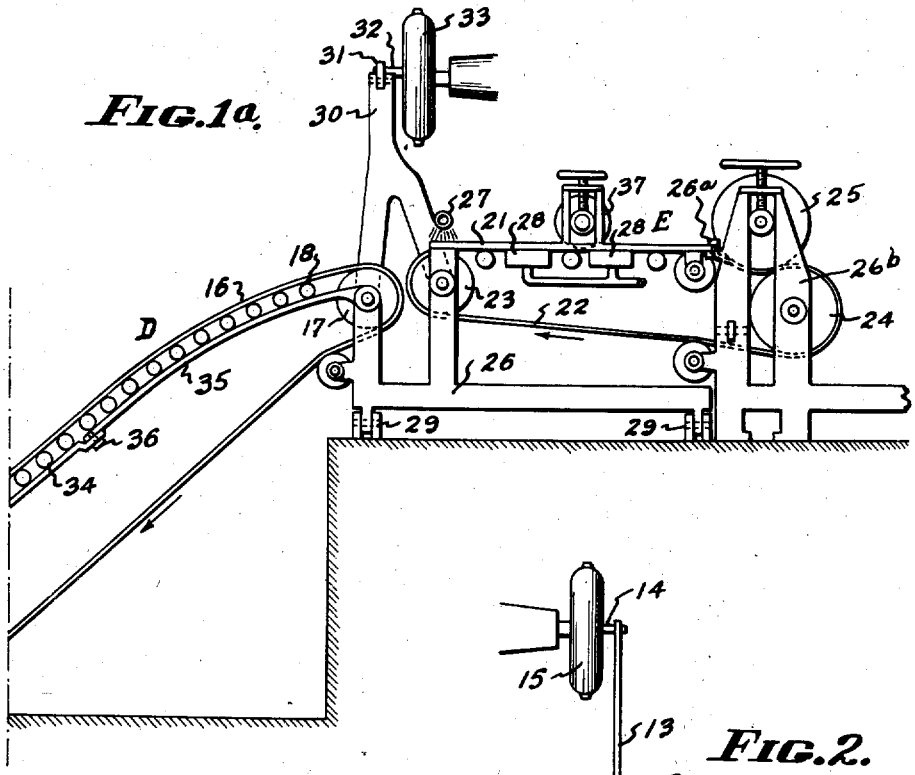
Figure 3:
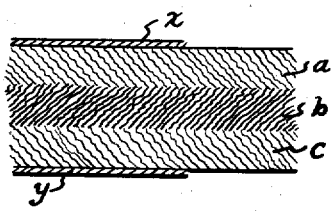
Figure 2:
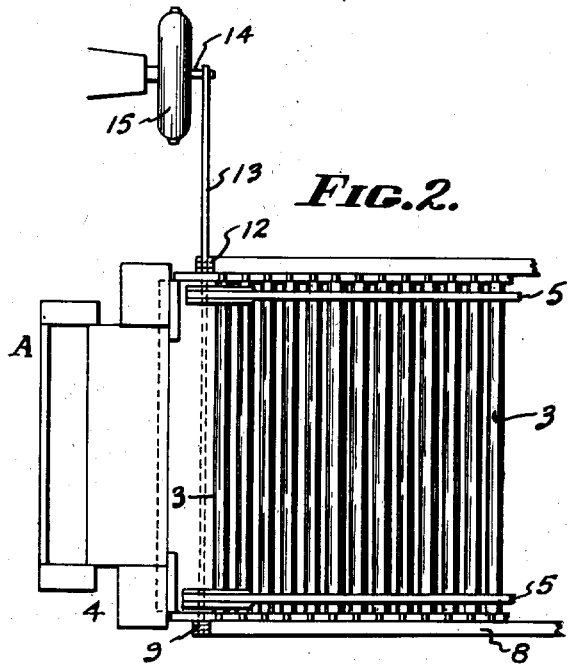

Figure 1 represents a side elevation of the major portion of a paper making machine capable of use in manufacturing multiple-ply paper embodying the present invention;

Figure 1[a] is a side elevation of the right hand end of the machine shown in Figure 1;

Figure 2 is a top plan view of a portion of the machine showing one of the devices for shaking the web-forming wires of the machine, and Figure 3 represents on a greatly enlarged scale a section through a sheet of photographic paper made in accordance with the present invention.

Similar parts are designated by the same reference characters in the different views.

The invention comprehends multiple-ply paper of different kinds and adapted for various uses where a strong and tough paper is required or desirable, the plies of the paper being united intimately and permanently without the use of a paste or other adhesive. Multiple-ply paper suitable for various purposes may be provided inexpensively, such for example, as paper sheets having a relatively coarse or inexpensive quality of fibre forming the intermediate body and higher quality of fibre for the outer or facing layers. The invention is particularly applicable to photographic paper having both sides thereof sensitized, such paper, according to the present invention having an intermediate ply or body of an opaque or light-intercepting character and outer plies or facings of a nature suitable to receive the sensitized photographic emulsions, the different plies of the composite paper being so united by interlocking of the fibres thereof that separation of the plies is prevented without the necessity of using paste or other adhesive, and furthermore, the paper will withstand setting or soaking in a developing, fixing or washing bath or similar treatment without separation of the plies or "blistering" of its surface.

Figure 3 represents diagrammatically and on a greatly enlarged scale, a section through a double-sided photographic paper capable of being produced by the method and apparatus hereinafter described, *a* and *c* represent the outer layers produced by the webs formed in the units A and C, these outer layers being white, while *b* represents the interposed opaque layer produced by the web formed in the unit B. *x* and *y* represent sensitized emulsions or coatings applied to the outer faces of the outer layers *a* and *c*.

The apparatus shown in the accompanying drawings is capable of making a sheet of strong and tough paper made up of three plies. This apparatus, as shown, comprises a group of web-forming units A, B and C, on which the respective plies or layers, such as the plies or layers *a*, *b* and *c*, Fig. 3, are made, a unit D on which the respective plies or layers are brought together in superposed relation, and a unit E on which the assembled superposed plies or layers are united, after which the composite paper sheet or web will pass under the dandy roll, through the couch rolls, onto the drying cylinders and otherwise treated in the manner in which ordinary paper is treated, in order to produce the final finished paper.

Each of the web-forming units A, B and C is similar in its general construction to the Fourdrinier machine commonly used in the manufacture of ordinary paper, each unit comprising an endless wire or foraminous apron 1 which passes over end pulleys or rolls 2 at a regular speed during the operation of the apparatus, the upper stretch of this wire or apron being supported in a level flat form by idler rolls 3. The wire travels through a suitable tank or chamber, it receiving paper pulp at one end from a trough 4 or other suitable means in a manner similar to that in which the paper pulp is supplied ordinarily to the Fourdrinier machine of the usual paper making apparatus, and overflow of this pulp solution from the side or longitudinal edges of the wire or apron is prevented by the usual deckle straps 5. A save-all box 6 is preferably located below the upper stretch of the wire, as usual, to receive the portions of the pulp solution which pass downwardly through the wire or apron. It will be understood that in the operation of the apparatus, the wires or aprons will be driven at a constant or definite rate of speed in relation to the rate of speed at which the pulp solution is flowed onto the upper stretches of the wires and that the web produced by the draining of the liquid portion of the solution through the wire, leaving the fibres of the pulp deposited on the upper surface of the upper stretch of the wire, will pass off from the right hand end of each wire. Each unit may be provided with a suction box 7 near its web discharge end, to remove any surplus or remaining liquid from the web, thus giving the web sufficient strength to proceed through the apparatus, as will be hereinafter described. By this arrangement, it will be understood that a separate web is produced by each of the units A, B and C, these webs being delivered from these units to the unit D on which they are assembled in superposed relation to make up the composite or multiple-ply paper strip comprising layers such as the layers *a*, *b* and *c*, Fig. 3.

In order to cause interlocking of the fibres of the pulp solution while these fibres are being deposited on the wire or apron of each of the units A, B and C, and thus increase the strength and toughness of the respective layers, it is preferable to impart a shaking action in a substantially horizontal plane to the wire or apron of each of the units A, B and C and this shaking action may take place in a direction either laterally or longitudinally or both laterally and longitudinally of the direction of travel of the web. As shown in the present instance, the wires of the units A and C receive a lateral shaking action while the wire or apron for the intermediate unit B receives a longitudinal shaking action. For this purpose the frame 8 which carries one end of the wire or apron and the pulley or roller 2 at the pulp-receiving end of the unit, is supported on uprights 9 which are pivoted at 10 so that they may shift laterally to the requisite degree, and the opposite end of the frame 8 is pivoted at 11 for the same purpose. The frame 8 of the intermediate unit B which receives a longitudinal shaking movement is pivotally supported by the legs 9ª which permits such longitudinal movement of the frame 8, due to the arrangement of the pivots 10ª, and the end of the frame 8 toward the web-discharge end of this unit has a limited longitudinal movement relatively to the pin 11ª. Any suitable means may be provided for imparting the shaking movement to the wires of the different units. In the present instance, the frame 8 of the units A and C has an upwardly projecting extension 12 which is connected by a link 13 to a crank pin 14 on a driving wheel 15, the latter being driven continuously during the operation of the apparatus by a belt or other suitable driving means. The frame 8 of the intermediate unit B has a similar upward extension 12ª which is connected by a link 13ª to a crank pin 14ª on a driving wheel 15ª which also may be driven by a belt or other suitable means during the operation of the apparatus. By the arrangement described, the extensions 12 on the frames 8 of the units A and C will vibrate laterally to impart a transverse shaking movement of the wires of these units, while the extension 12ª on the frame 8 of the intermediate unit B will be vibrated longitudinally, thus imparting longitudinal shaking motion to the wire of this unit. In this manner the fibres while being deposited on the wires of the top and bottom units A and C will be arranged transversely of the direction of motion of these wires, or substantially so, while the fibres being deposited on the wire of the intermediate unit B will be arranged longitudinally of the direction of motion of the wire of this unit, or substantially so, thus causing the fibres of the different webs produced on the units A, B and C to be crossed and thus interlocked when these webs are assembled in superposed relation to form the composite paper sheet.

The unit D to which the webs formed on the units A, B and C are delivered comprises preferably an endless wire cloth or apron 16 similar to the wire or apron commonly used on Fourdrinier machines, this wire passing over pulleys or rollers 17 and having its upper stretch supported and guided by a series of idler rollers 18. Preferably the units A, B and C are mounted one above another but offset longitudinally, as shown in Figure 1, and the wire or apron of the unit D is arranged on an incline so that its upper stretch is in close proximity to the web-delivery ends of the units A, B and C. In practice, the wire or apron 16 will be driven regularly at a speed equal to or in definite relation to the speed of the wires of the units A, B and C. The web produced on the lowermost unit C to make, for example, the ply or layer *c*, Fig. 3, will be delivered to the upper side of the wire or apron 16 at a point near the lower roller or pulley 17 and the web will be carried upwardly with the ascending upper stretch of the wire or apron 16. The intermediate unit B will deliver the web produced by it, to make, for example, the ply or layer *b*, Fig. 3, onto the upper side of the web produced on the lowermost unit C. Similarly, the paper web produced by the uppermost unit A, to make, for example, the ply or layer *a*, Fig. 3, will be delivered from this unit onto the upper side of the web produced by the intermediate unit B and these three webs in superposed relation to one another will be delivered from the upper end of the unit D to the unit E for further treatment, as will be hereinafter described.

In order to effect or facilitate interlocking of the fibres of one web with the fibres of another web and thus increase the strength and toughness of the composite paper strip, a pair of fluid-injecting pipes 19 and 20 or equivalent means is provided for spraying water or other liquid or fluid onto the web or webs, prior to the superposing of another web thereon, whereby these webs are softened to an extent that will facilitate the final and complete interlocking of the fibres of the composite sheet and thus form a single unitary but composite paper sheet. As shown, the water or fluid injecting pipe 19 will supply water or liquid to the upper surface of the web delivered by the unit C to the unit D, prior to the superposing of the web from the intermediate unit B thereon and similarly the pipe 20 will supply water or other suitable fluid to the upper side of the web delivered to the unit D by the unit B, prior to the superposing of the web from the upper unit A thereon.

The unit E is preferably employed to finally unite the webs to form a single strong, tough and unitary paper strip. This unit, as shown, comprises a table 21 over which the composite web delivered from the upper end of the unit D passes, and an endless wire cloth or apron 22 which is driven in unison with the wire or apron 16 and passes over the top of the table 21 in the direction in which the web is advancing. The wire or apron 22, as shown, passes over rolls 23 and 24 the latter of which may be one of the couch rolls as ordinarily used in paper making machines, the other couch roll 25 being arranged above the roll 24, as shown, these rolls being mounted in a frame 26a. Means such as a perforated pipe 27 is preferably arranged above the wire or apron 22 at or near the web-receiving end of the unit E, this pipe serving to supply water or other suitable liquid to the upper surface of the composite web made up of the web produced on the units A, B and C. A pair of vacuum boxes 28 is also preferably provided beneath the upper stretch of the wire or apron 3, these vacuum boxes serving to draw the liquid from or through the composite web resting on the wire or apron immediately above the vacuum boxes, thereby not only uniting the layers compactly but also causing an interlocking between the fibres of the different webs or layers. To facilitate this interlocking action, the unit E and particularly the web-supporting wire thereof is preferably subjected to a shaking action. For example, as shown, the wire of this unit and the related mechanism thereof carried by the frame 26 may shake or vibrate laterally or in a direction transversely to the direction of movement of the web, owing to the pivotal mounting of the frame 26 at the points 29 and an extension 30 on the frame 26 may be connected by a link 31 to the crank pin 32 of a driving wheel 33, this driving wheel operating during the operation of the apparatus to impart a lateral or transverse shaking movement of the unit E and particularly to the web-supporting wire thereof. In this arrangement, when used, the frame of the unit D may be formed in two sections 34 and 35, the upper section 35 which is adjacent to the unit E being pivoted at 36 to the lower section 34 and the upper section 35 may be conveniently carried by or attached to the frame 26 of the unit E so that the upper or web-delivery end of the unit D will participate in the shaking action to which the unit E is subjected, thus avoiding breakage of or injury to the web. The composite web, after the liquid supplied to it by the pipe 27 has been removed by the forward vacuum box 28, passes beneath a dandy roll 37 which functions like the dandy roll used in the ordinary method of making paper, after which the web passes between the couch rolls 24 and 25 and onto the drying cylinders and may be further treated in the manner usual with ordinary paper.

According to the above described method of procedure, the paper web is produced initially from pulp solution by each of the units A, B and C. These individual paper webs are delivered onto the wire of the unit D so that these individual webs are assembled in superposed relation to one another but without the application of pressure thereto. To facilitate interlocking of the fibres of the different layers forming the composite web of paper strip, water or other suitable fluid or liquid is supplied to the surface of each web prior to the superposing of another web thereon. The composite web received by the unit E and while uncompressed, is united as to its constituent plies by subjecting the composite web to a suction action which withdraws the liquid or fluid contained by it and preferably an additional supply of liquid or fluid is flowed onto the upper surface of the composite web and this liquid also is drawn through and withdrawn from the composite web by the suction boxes, this latter action upon the composite web while still uncompressed causing interlocking of the fibres of the different webs or layers, after which the composite web is subjected to the compressing action of a dandy roll, then to the usual couch rolls and may be further treated and finished as may be desired or required.

The invention is particularly applicable to photographic paper of the kind which is sensitized on both sides thereof, as at *x* and *y*, (Fig. 3) with an intervening opaque layer, such as *b*. In producing photographic paper of this kind, the procedure may be the same as that hereinbefore described, with the exception, however, that the pulp supplied to the units A and C will be of a kind suitable for the making of white paper layers *a* and *c*, while the pulp supplied to the intermediate unit B for the making of the intermediate layer *b* will be of an opaque nature, as, for example, as may be produced by incorporating a suitable kind and quantity of opaque or non-actinic coloring matter of a permanent nature with such pulp. In consequence, the opaque web *b* produced by the unit B and delivered to the unit D will be interposed between the white paper webs *a* and *c* produced and delivered by the units A and C and as these individual webs produced by the units A, B and C are sufficiently set when delivered by their respective units to maintain substantially their structural form, there will be no objectionable intermixing of the opaque fibres of the intermediate web *b* with the white fibres of the outer webs *a* and *c*, although the fibres of the intermediate and outer webs will be interlocked in the zones of their contacting faces to an extent sufficient to interlock the webs to form a unitary structure, without requiring the use of paste or other adhesive.

The present invention provides a multiple-ply paper which can be manufactured on a commercial scale and inexpensively, and will be of uniform thickness and quality, and such paper can be made relatively thin or of any desired thickness depending on the purposes or uses to which it is to be applied, and the relative thickness of its constituent plies can be varied as desired. While the paper herein shown and described is made of three plies, it is to be understood that the same may have different numbers of plies; for example, in the manufacture of photographic paper having one side only sensitized, as for instance, photographic post cards, visiting cards or the like, a body or backing ply may be employed in conjunction with a facing ply on one side only, the two plies, however, being united and otherwise treated as hereinbefore described.

I claim as my invention:

1. A paper sheet comprising a photographically opaque ply and a facing ply united permanently therewith by interlocking of the fibres of the plies.

2. A sheet of photographic paper comprising an intermediate photographically opaque ply and facing plies on opposite sides thereof and united therewith by interlocking of the fibres of the plies and sensitized photographic coatings applied to the surfaces of the facing plies.

3. A paper sheet comprising a photographically opaque ply, and facing plies on both sides thereof united permanently therewith by interlocking of fibres of the plies.

4. A paper sheet comprising a photographically opaque ply, and facing plies on both sides thereof united permanently therewith by interlocking of fibres of the plies, said opaque ply being formed of pulp into which is incorporated a non-actinic coloring matter.

EZRA B. FISH.